United States Patent [19]

Gotou et al.

[11] Patent Number: 4,792,897
[45] Date of Patent: Dec. 20, 1988

[54] ADDRESS TRANSLATION UNIT FOR TRANSLATION OF VIRTUAL ADDRESS TO REAL ADDRESS USING TRANSLATION TABLES OF MULTI-LEVEL HIERARCHICAL STRUCTURE

[75] Inventors: Shizuo Gotou; Toyohiko Kagimasa, both of Hachioji, Japan

[73] Assignee: Hitachi, Ltd., Tokyo, Japan

[21] Appl. No.: 783,084

[22] Filed: Oct. 2, 1985

[30] Foreign Application Priority Data

Oct. 3, 1984 [JP] Japan ................................ 59-206219

[51] Int. Cl.[4] ............................................ G06F 12/10
[52] U.S. Cl. .................................................... 364/200
[58] Field of Search .............................. 364/200, 900

[56] References Cited

U.S. PATENT DOCUMENTS

| 4,215,402 | 7/1980 | Mitchell et al. | 364/200 |
|---|---|---|---|
| 4,356,549 | 10/1982 | Chueh | 364/200 |
| 4,376,297 | 3/1983 | Anderson et al. | 364/200 |
| 4,521,846 | 6/1985 | Scalzi et al. | 364/200 |

Primary Examiner—Gary V. Harkcom
Assistant Examiner—David L. Clark
Attorney, Agent, or Firm—Antonelli, Terry & Wands

[57] ABSTRACT

An extended address translation equipment wherein an address translation buffer has entries each provided with a record of translation table addresses of each level, thereby eliminating the need for accessing the translation table up to a portion consistent with the virtual address.

4 Claims, 6 Drawing Sheets

ADDRESS TRANSLATION UNIT FOR TRANSLATION OF VIRTUAL ADDRESS TO REAL ADDRESS USING TRANSLATION TABLES OF MULTI-LEVEL HIERARCHICAL STRUCTURE

BACKGROUND OF THE INVENTION

The present invention relates to a translation lookaside buffer for translating a virtual address into a real address at a high speed and, particularly, to an address translation unit suitable for speeding up the translation process where multilevel address translation tables with extended virtual address are used.

Among hierarchically structured address translation tables for translating a virtual address into a real address, there have been used tables of two-level structure as described in the IBM Manual: System 370 Principle of Operation (GA22-7000-8), Section: Dynamic Address Translation.

However, when the virtual address is extended significantly from 31 bits to 64 bits, for example, the two-level hierarchical structure is not sufficient, but it is natural to arrange a multi-level hierarchical structure as high as five levels. The reason is that, if the execution with the address extension is left at two-levels a large number of entries is necessary for the translation table, and a large continuous memory area for the translation table is required. By the arrangement of a multi-level hierarchical structure, the size of the continuous memory area can be reduced.

A deficiency resulting from the multi-level structure is the impairment of process performance when the entry does not exist in the translation buffer which is provided for the speed-up of translation. A two-level structure causes a memory request to be initiated twice, while five-level structure requires a memory request to be initiated five times.

SUMMARY OF THE INVENTION

An object of the present invention is to provide an address translation unit which reduces the number of reference accesses to the multi-level address translation tables implemented when the entry consistent with the virtual address to be translated does not exist in the translation lookaside buffer provided for the speed-up of address translation, thereby minimizing the time needed for address translation.

The conventional translation lookaside buffer merely stores virtual addresses and real addresses in a pair, and therefore if address translation has failed, it must be restarted from the highest-order translation table. The present invention has the feature that the address of translation table of each level is also recorded in each entry of the address translation buffer, thereby eliminating the need for accessing the translation table up to a portion consistant with the virtual address.

BRIEF DESCRIPTION OF THE DRAWINGS

FIG. 7 is a table explaining the operation of the decoder 16 shown in FIG. 5.

DESCRIPTION OF THE PREFERRED EMBODIMENT

An embodiment of the present invention will be described with reference to FIGS. 1 through 5.

Figure 1:
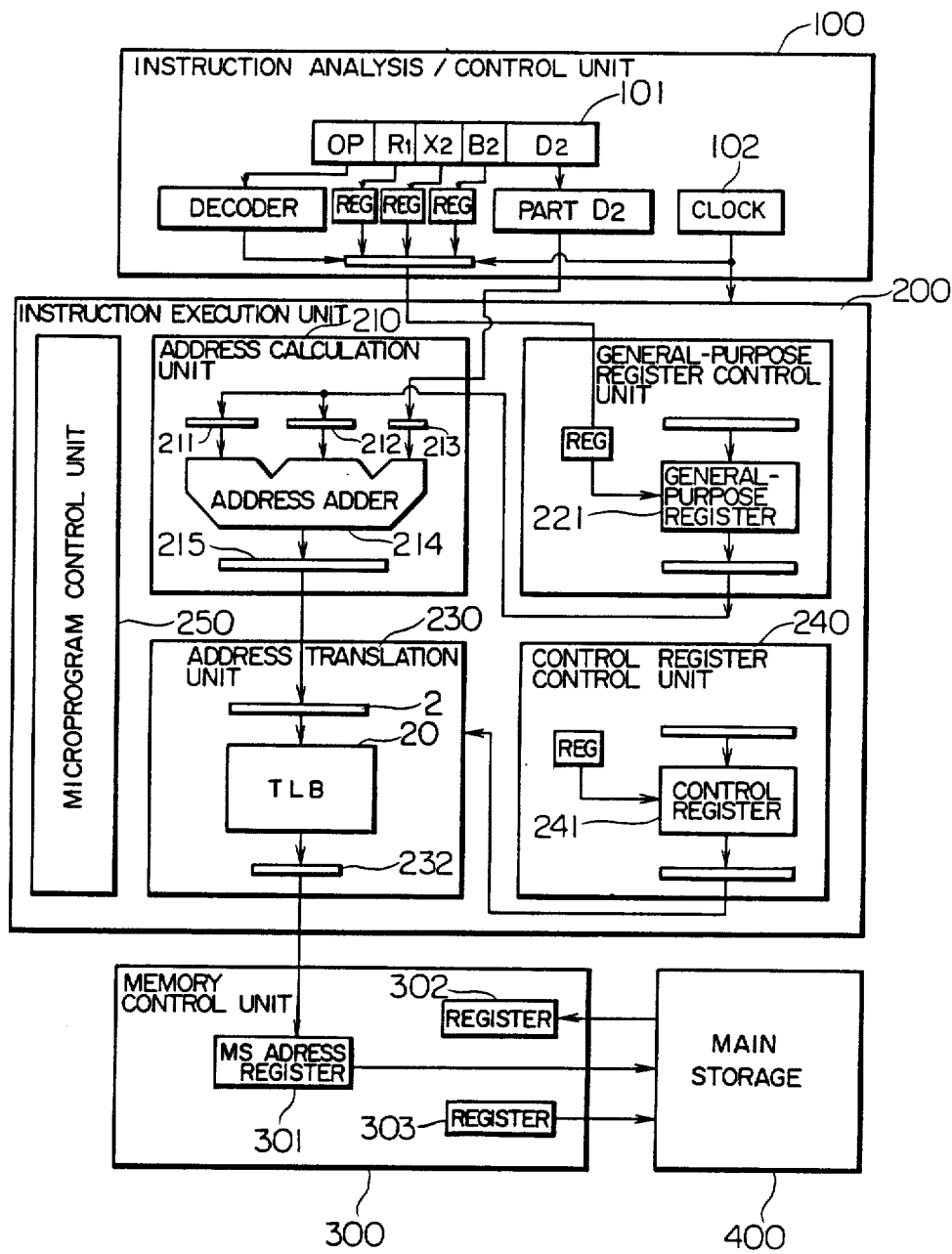
FIG. 1 is a block diagram of the information processing system to which the present invention is applied.

FIG. 1 shows the arrangement of the information processing system to which the present invention is applied. The arrangement consists of the following units.

(1) Instruction analysis/control unit, 100

This unit decodes instructions and controls the operation of other units.

(2) Instruction execution unit, 200

This unit implements the execution of instructions, and is the section of the system to which the present invention is applied.

(3) Memory control unit, 300

This unit controls data transaction with the main storage (MS) 400

The above is a general system arrangement.

Next, the arrangement of the instruction execution unit 200, to which the present invention is applied, is as follows.

(1) Address calculation unit, 210

This unit calculates the virtual address.

(2) General-purpose register control unit, 220

This unit controls reading and writing of general-purpose registers 221.

(3) Address translation unit, 230

This unit translates a virtual address provided by the address calculation unit 210 into a real address.

(4) Control register control unit, 240

This unit controls reading and writing of control registers 241. In this embodiment, the first one (not shown) of the control registers 241 is used for address translation.

(5) Microprogram control unit, 250

This unit stores the microprogram for controlling the execution of instructions, and the above units 210, 220, 230 and 240 operate under control of this microprogram control unit.

Since the above arrangement is quite general, detailed explanation will be omitted. The following describes the role of address translation through the explanation of the process flow for instruction words in connection with FIG. 1.

The operation code (OP) in an instruction word 101 fetched from the MS 400 is decoded to recognize the type of instruction, and the parts of the instruction word are extracted. The address of the operand is calculated on the basis of parts B2, X2 and D2 of the instruction word. In practice, (a) the content of part B2 is fed to the general-purpose register control unit 220 so that the content of a general-purpose register specified by B2 is read and is set as B2 register data 211; (b) in the same way as (a), a value is set for X2 register data 212 in correspondence to part X2; (c) the content of part D2 of the instruction word is set in the D2 data register 213; (d) addition is carried out by the address adder 214 which has the inputs of the B2 register data 211, X2 register data 212 and D2 data register 213, and the result is set in the address register 215. The content of the register 215 is called the "virtual address", and conversion of the virtual address into the actual address (real address) of the MS is the role of the address translation unit 230. The resultant real address is set in the translation address register 232, as will be described in detail later. The content of the translation address register 232 is fed to an MS address register 301 in the memory control unit 300, and is used for the fetching or storing operation for the MS 400. Data fetched from the MS 400 is set in a register 302, and data to be stored in the MS 400 is set in a register 303. These are the process flow operations for an instruction word and the role of the address translation unit 230 in the process.

Figure 2:
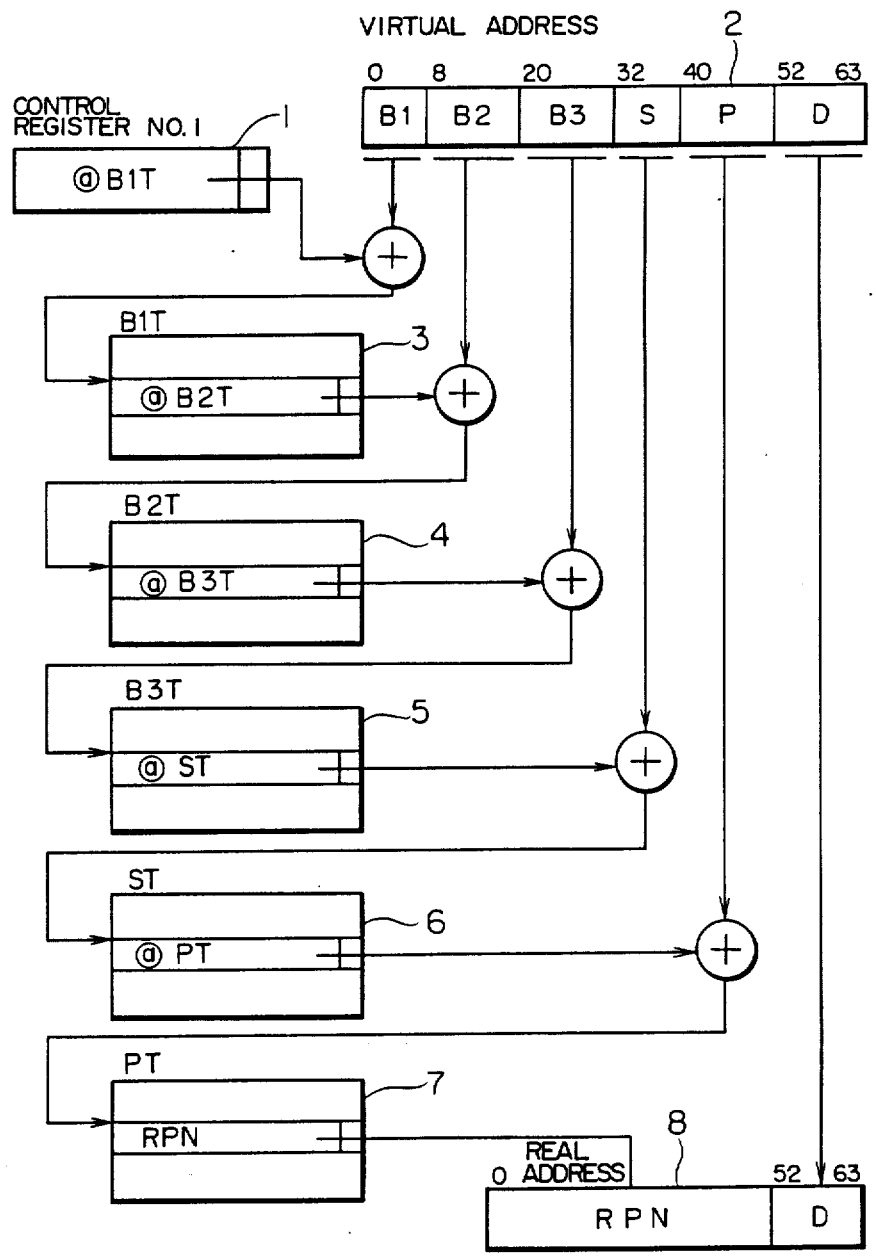
FIG. 2 is a diagram showing the extended virtual address to which the present invention is applied effectively, and the hierarchical structure of the virtual-to-real address translation table.

FIG. 2 shows the arrangement of the address translation table for converting a virtual address into a corresponding real address. The address translation tables are stored in MS 400 shown in FIG. 1. In this embodiment, the virtual address is made up of 64 bits, and it is segmented in six parts as follows.

(1) Part B1
(2) Part B2
(3) Part B3
(4) Part S
(5) Part P
(6) Part D

Control register 1 is used to point to the starting address of the translation tables in a hierarchical structure. The content of the control register 1 increased by the value of the virtual address part B1 becomes the address of the entry in table S corresponding to part B1, and the entry includes the starting address of the translation table 4 for part B2. The starting address of the part B2 translation table increased by the value of part B2 in the virtual address becomes the address of the entry in table 4 corresponding to part B2, and the entry includes the starting address of the part B3 translation table 5. In the same way, the starting address of the part S translation table 6 and the starting address of the part P translation table 7 are obtained. The entry corresponding to the value of part P in the part P translation table 7 includes the real page number (RPN). The RPN linked with part D in the virtual address becomes the real address corresponding to that virtual address.

In the above process, the low-order section of the entry of each translation table includes an invalid bit, and if it has a value of "1", the virtual address is assumed to be not assigned to a real address and a program interrupt of address translation exception will arise.

Figure 3:
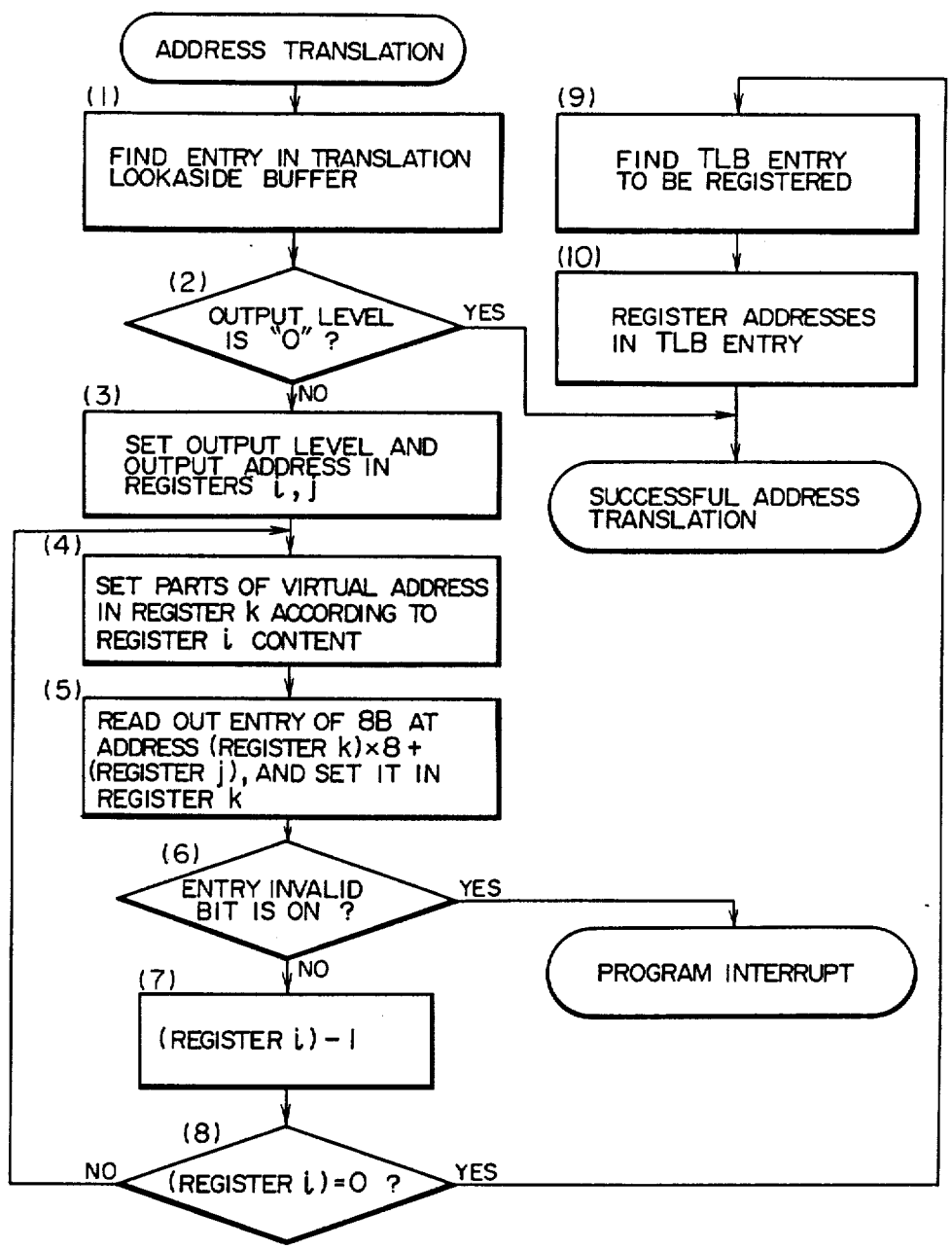
FIG. 3 is a flowchart showing the address translation process.
Figure 4:
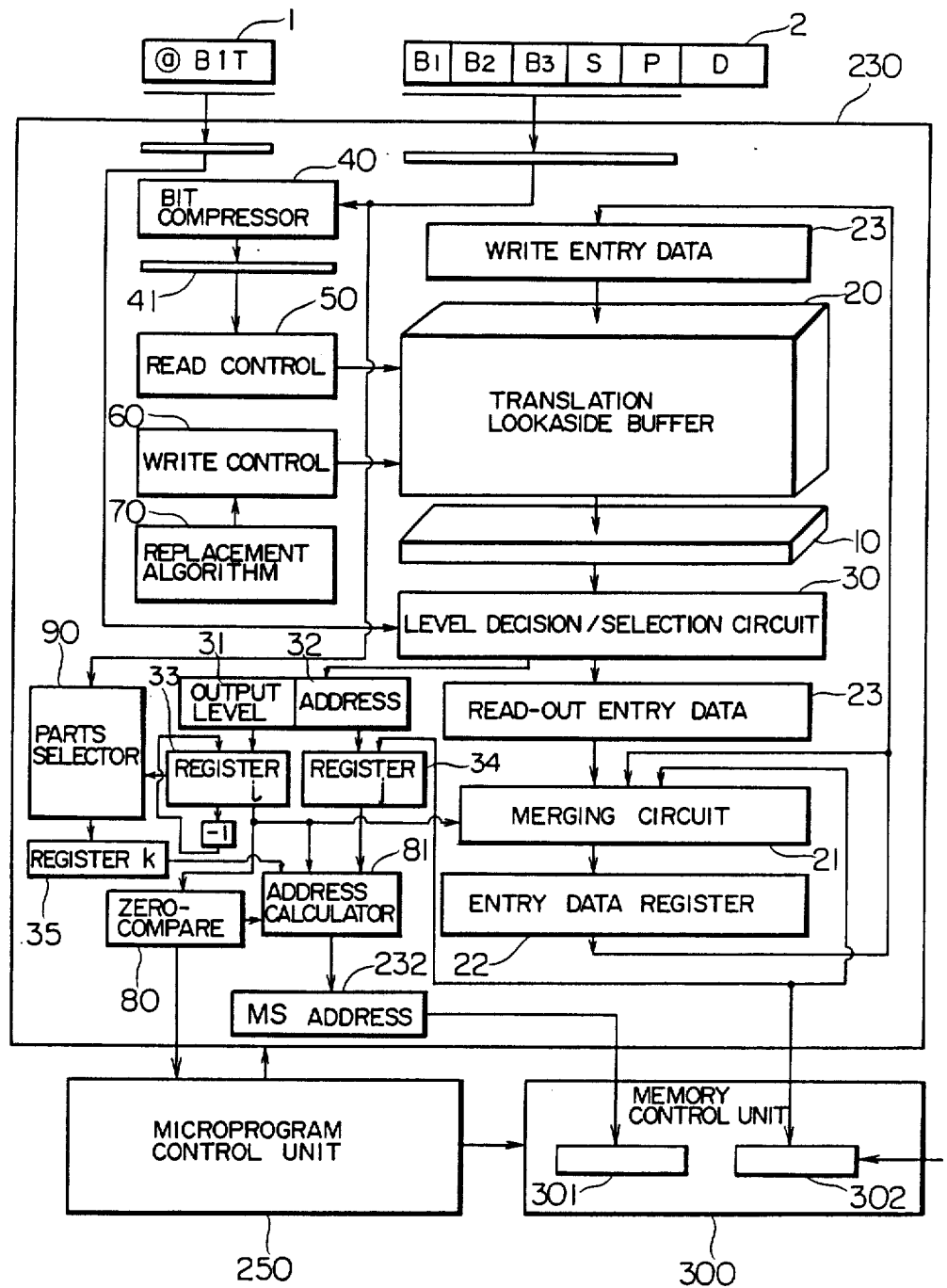
FIG. 4 is a block diagram showing the overall arrangement of the address translation unit 230 that is the section to which the present invention is applied directly.

Next, the address translation process in accordance with the present invention will be described in connection with FIGS. 3 and 4. FIG. 3 shows the flow of the microprogram control, and FIG. 4 shows the overall circuit arrangement for implementing the control.

(1) Data having a longest portion consistent with the virtual address from the high-order end thereof is detected in the translation lookaside buffer. In FIG. 4, the translation lookaside buffer 20 is arranged to have multiple planes. Each plane stores a plurality of entries. Partial bits in the virtual address are selected by the bit compressor 40 and fed to each plane of the translation lookaside buffer 20. Then, the content of a position specified by the compressed bits 41 is outputted from each plane. The bit compressor 40 is preferably arranged using, for example, a hash circuit (known). A read control circuit for retrieving a plurality of outputs 10 for a single input is known in the art and detailed explanation thereof will be omitted. These outputs 10 are fed to the selection circuit 30, which selects one which has the longest portion consistent with the virtual address from the high order end thereof.

Figure 5:
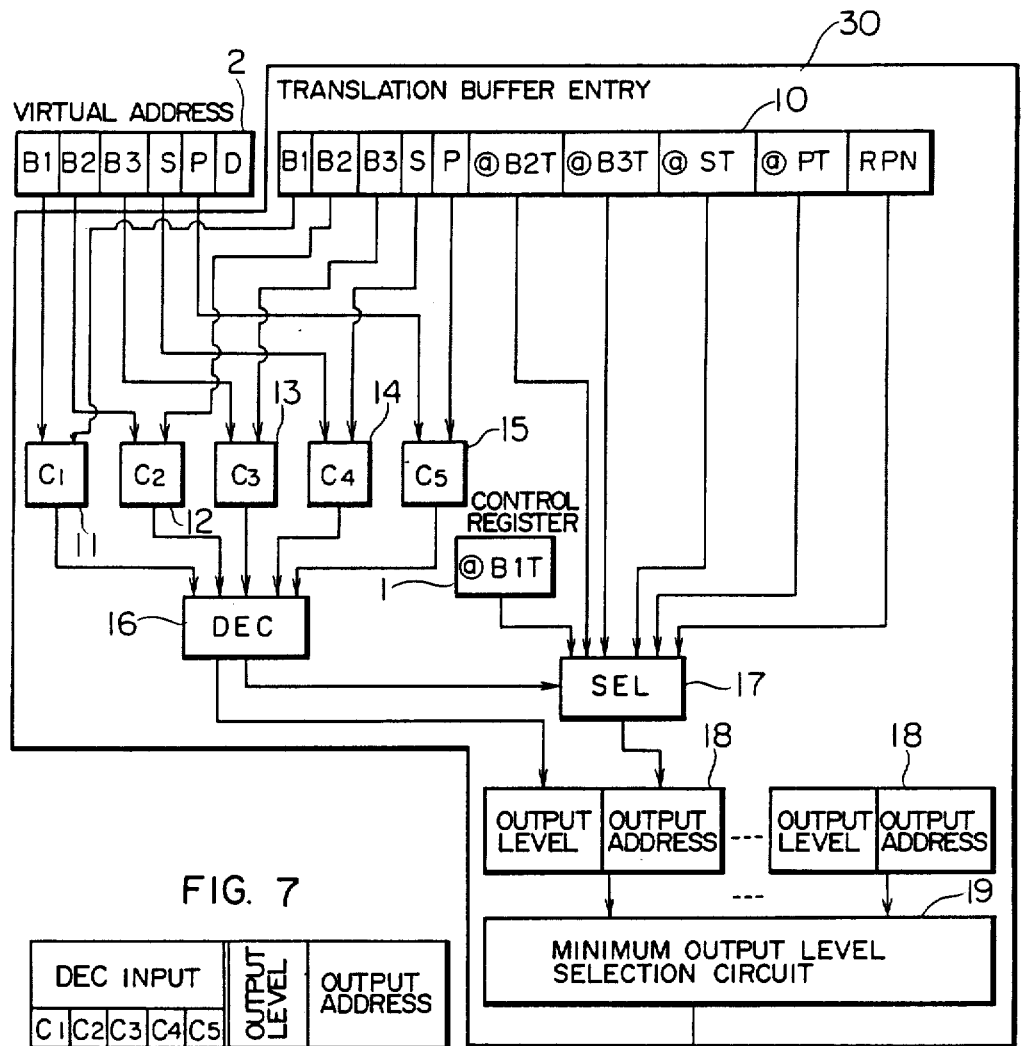
FIG. 5 is a block diagram showing the circuit for discriminating the effective level of the translation lookaside buffer.

FIG. 5 shows the selection circuit which is the principal section for the address translation process using the translation lookaside buffer, the direct application subject of this invention. Each entry 10 of the translation lookaside buffer contains ten kinds of information as follows.

(a) Part B1 of virtual address
(b) Part B2 of virtual address
(c) Part B3 of virtual address
(d) Part S of virtual address
(e) Part P of virtual address
(f) Starting address of B2T table
(g) Starting address of B3T table
(h) Starting address of ST table
(i) Starting address of PT table
(j) Real page number (RPN) for virtual address Comparison between the virtual address to be translated and the translation lookaside buffer entry takes place a follows. Five parts of the virtual address are compared with those in the translation lookaside buffer entry using comparators $C_1$ 11, $C_2$ 12, $C_3$ 13, $C_4$ 14 and $C_5$ 15, respectively. Each comparator provides an on-output or off-output in response to the consistent or inconsistent comparison result. Five output signal lines are connected to the inputs of the decoder (DEC) 16. The decoder 16 provides one output used as a selection information for the selector (SEL) 17 and another output used as code information of the output level. The correlation between the values on the five input lines of the decoder 16 and its output information 18 is as shown in FIG. 7.

Figure 6:
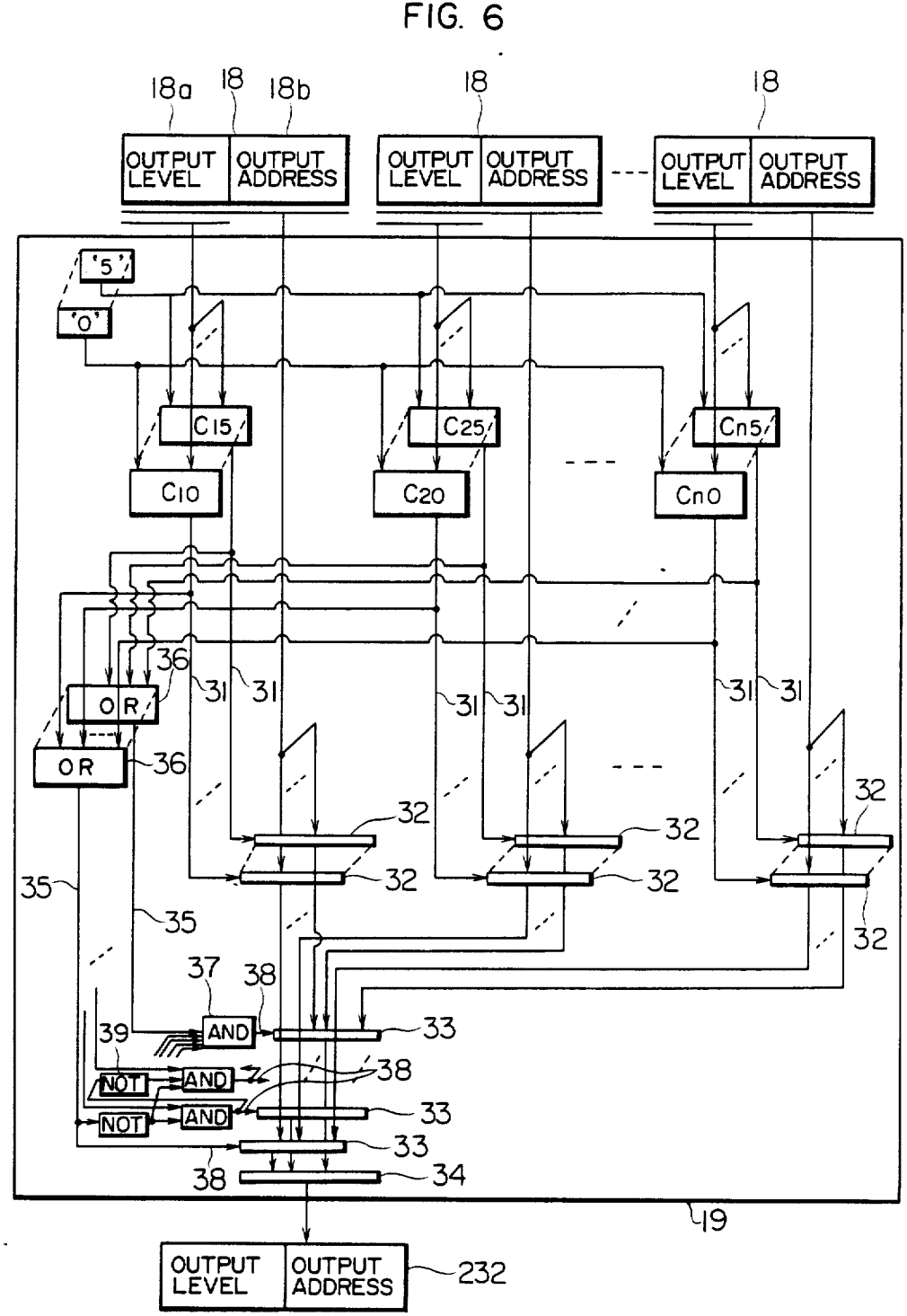
FIG. 6 is a schematic diagram of the circuit for selecting an entry which provides the longest coincidence of addresses.

Output information 18 on each plane of the translation lookaside buffer is inputted to the minimum output level selection circuit 19, and consequently an entry having a minimum output level is selected. FIG. 6 shows the arrangement of the minimum output level selection circuit 19. In the figure, the output level 18a is compared with constants "0" through "5", and the value of output information 18 is fed to the input of the selector 33 via the selector 32 in accordance with the comparison result signal line 31. The OR circuits 36 have their output signal lines 35 indicating whether inputs equal to the output levels 0–5 have been detected. The output signal lines 35 are dealt with by NOT circuits 39 and AND circuits 37, so that one of the selectors 33 has its selection signal line 38 placed in the on-state with the remainder being kept in the off-state. In this case, when a signal line with a lower output level turns on, selection signal lines 38 having higher output levels turns off. In this way, one of the selectors 33 is selected to provide output information 232 through the register 34.

(2) It is tested by the comparator 80 whether the selected entry has a "0" output level. If the output level is "0", indicating that a relevant entry has been found, address translation is completed succesfully.

(3) If the output level is not "0", the output level 31 and output address 32 are set in the work registers (i, j) 33 and 34, respectively, and the following processing steps (4) through (8) are performed.

(4) The part selector 90 gets corresponding part information in the virtual address in response to the content of the register (i) 33, and sets it in the work register 35. For example, when the output level is "2", the value of part S in FIG. 5 is set in the register (k) 35.

(5) The address calculator 81 adds the content of register (k) 35 to the content of register (j) to form an address, and reads out data 302 of 8B from the memory. This data is set in the register (j) 34, and is also inputted to the merging circuit 21 for setting a value in the write entry data register 22 to the translation lookaside buffer 20. The merging circuit 21 sets the address section of a corresponding part in the enrry data register 22 in accordance with the content of register (i) 33.

(6) It is tested as to whether the invalid bit in the read-out data is "1". If it is detected to be "1", control is transferred to the program interrupt process, and processing is ended.

(7) If the invalid bit is not "1", the register (i) 33 (containing the output level) is reduced by one.

(8) If the content of register (i) 33 does not become zero, the sequence proceeds to processing step (4).

(9) If the content of register (i) 33 becomes zero, it means that address translation has been done successfully, and in this case registration in the translation lookaside buffer takes place. Namely, the conventionally known replacement algorithm is used to determine the entry position for registration.

(10) The content of entry data register 22 is written in the determined entry position, and the address translation process is ended. Information written in the entry position includes the following.

(a) Parts B1, B2, B3, S and P of the virtual address (b) Starting addresses of the B2T table, B3T table, ST table and PT table The above information is the one up to the effective level among the information included in the entry selected in (1), and the one that is read out sequentially in (5).

An embodiment of this invention has been described. This embodiment exemplifies the case where the 64-bit virtual address is segmented into six parts, however, it will be appreciated that the present invention is readily applicable to other cases of the virtual address with a different length or different manner of segmentation.

According to this embodiment, address translation can be processed fast for the case in which a virtual address to be translated is not found in the translation lookaside buffer. This embodiment enables the reduction in the number of memory references from five times to 1-5 times.

According to the present invention, each entry of the translation lookaside buffer is made to include the starting address of each level of the translation tables in hierarchical structure, allowing the translation lookaside buffer to get an entry nearest to the virtual address to be translated, whereby the starting address of the translation table of each level recorded in the nearest entry can be used when the entry which is completely consistent with the positional address has not been found in the translation lookaside buffer. As a result, the address translation process of the case where a relevant entry does not exist in the translation lookaside buffer effectively can be speeded up.

We claim:

1. An address translation unit for use in a system having means translating a virtual address to a real address by using a group of address translation tables having a hierarchical structure, wherein entries of each address translation table except that of a highest level each indicate a start address of an address translation table of a next adjacent level, wherein entries of each address translation table of the highest level indicate a real address and wherein each virtual address has plural address parts coresponding to different levels of said group of address translation tables and each indicating a location of an entry within one of said address translation tables of a corresponding level, said address translation unit comprising:

a translation look-aside buffer for holding entries each comprised of (1) an address pair consisting of a virtual address and a corresponding real address, and (2) a group of start addresses for the address translation tables required to be accessed for translation of the virtual address of that entry to the corresponding real address;

select means connected to said translation look-aside buffer and responsive to an applied virtual address for searching the entries of said translation look-aside buffer for an entry which has a virtual address having the largest number of consecutive address parts, starting from an address part corresponding to the lowest level, which coincide with corresponding address parts of the applied virtual address, including means for providing a real address within the entry when all of the address parts of the entry coincide with the address parts of the applied virtual address and for providing, from said entry having the largest number of coinciding address parts, that one of the group of start addresses within the entry which is the start address of an address translation table having the higher level next to a highest level among levels corresponding to consecutive coincident address parts, when all address parts of the entry and the applied virtual address do not coincide; and translation means responsive to the applied virtual address and said one start address from said select means for translating the applied virtual address by accessing said address translation tables, starting from that one having said one start address and based upon address parts of the applied virtual address corresponding to a level equal to or larger than the next level.

2. An address translation unit according to claim 1, wherein said select means includes comparison means for comparing the respective address parts of each entry of the translation look-aside buffer to the corresponding address parts of the applied virtual address, decoder means responsive to said comparison means for producing for each entry for which a comparing operation is performed by said comparison means an output level signal indicating a level corresponding to the number of consecutive address parts for which coincidence is detected and an output address selection signal designating said one start address, and selection means responsive to said selection signal for reading out said one start address from the entry.

3. An address translation unit according to claim 2, wherein said select means further includes means for holding as data pairs for each entry for which a comparing operation is performed by said comparison means said output level signal and said read-out one start address.

4. An address translation unit according to claim 3, wherein said select means further includes minimum output level selection means for selecting from said holding means a start address in a data pair having the highest level indicating output level signal.

* * * * *